Sept. 8, 1925.
A. B. BEITMAN
1,553,213
SPRING COVER AND LUBRICATOR
Filed May 11, 1922   3 Sheets-Sheet 1
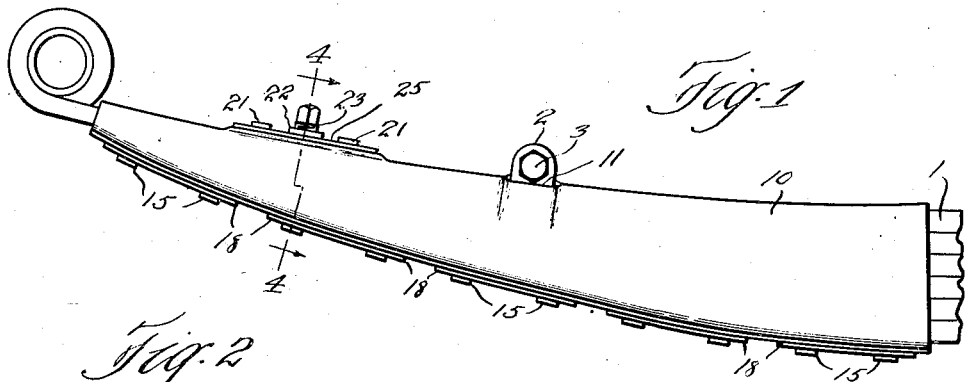
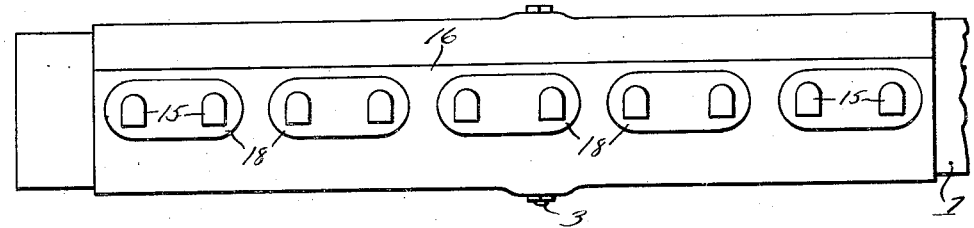
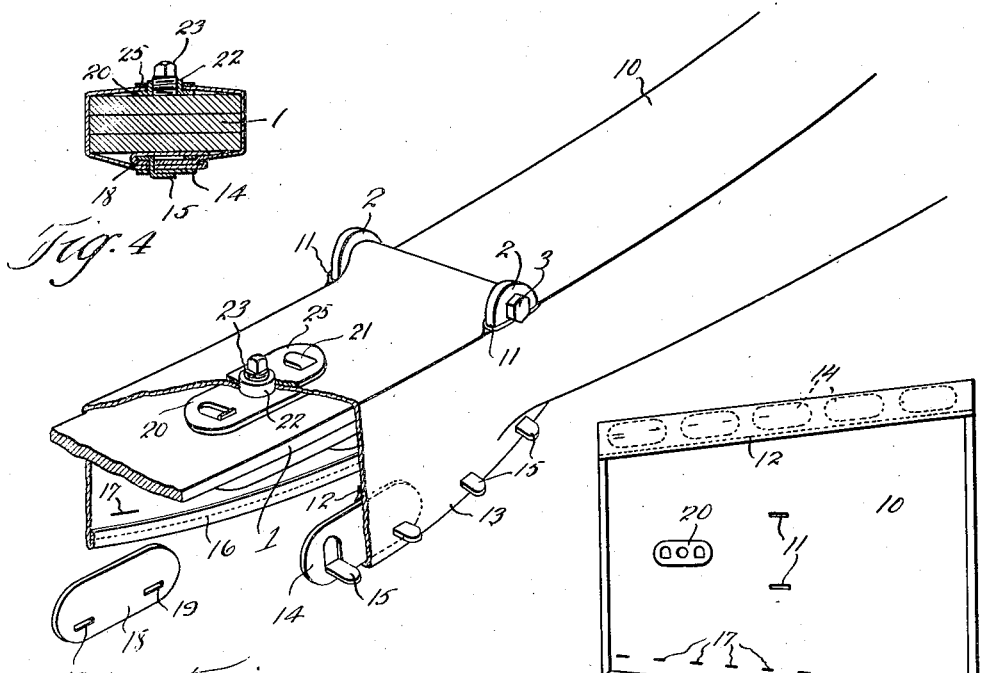

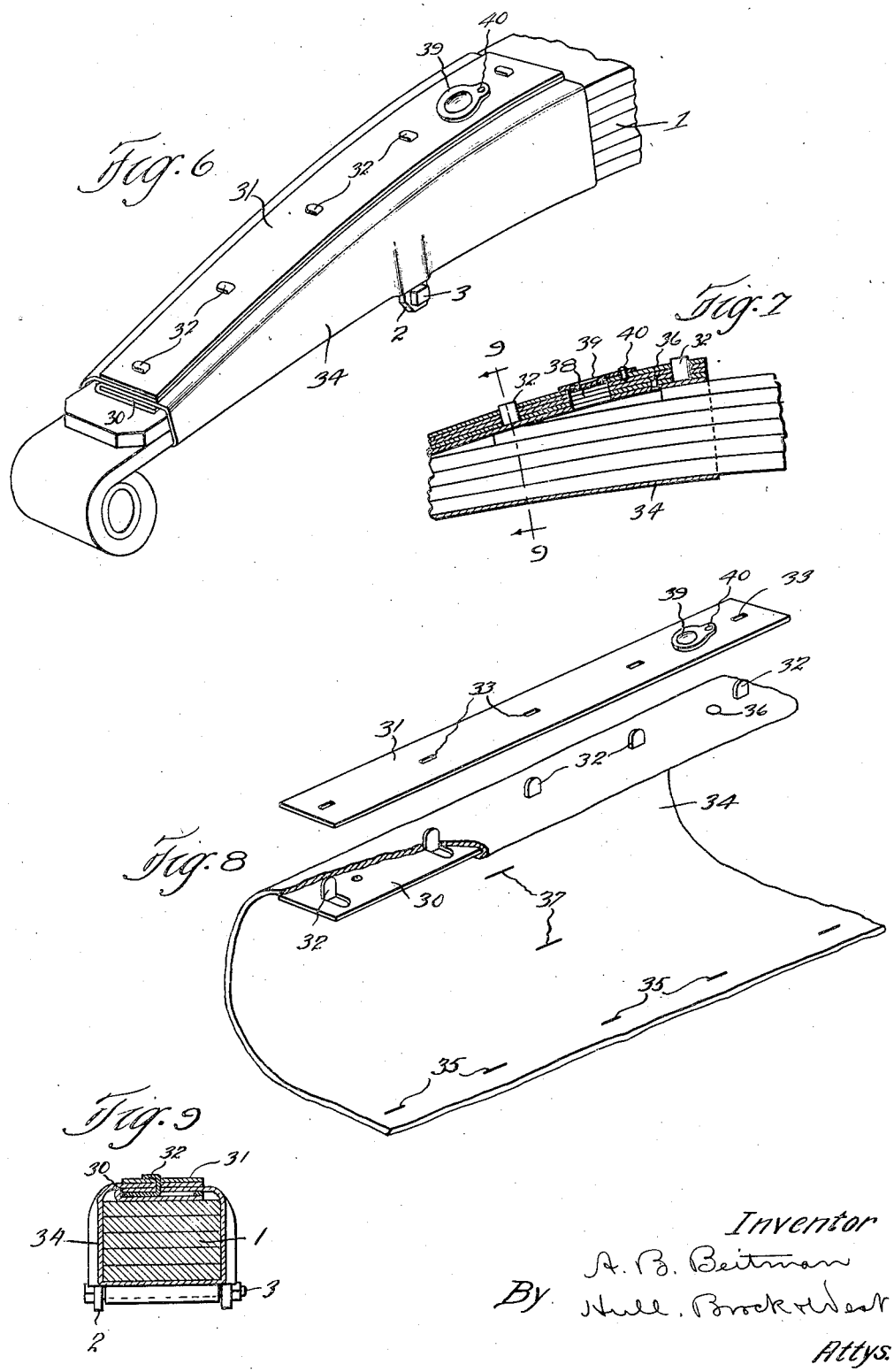

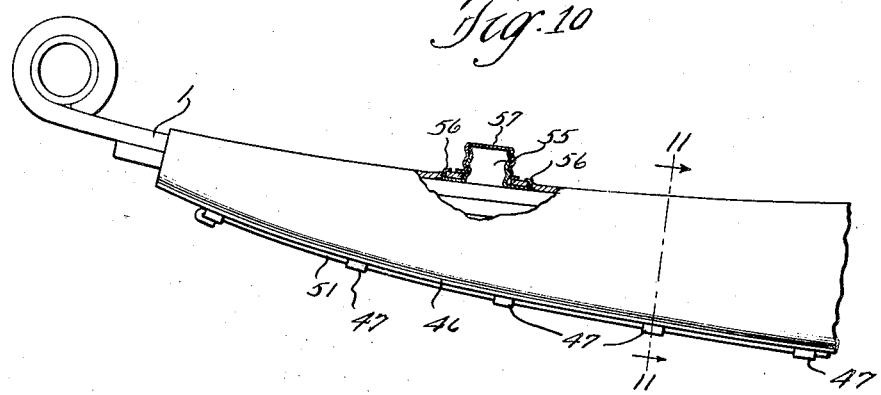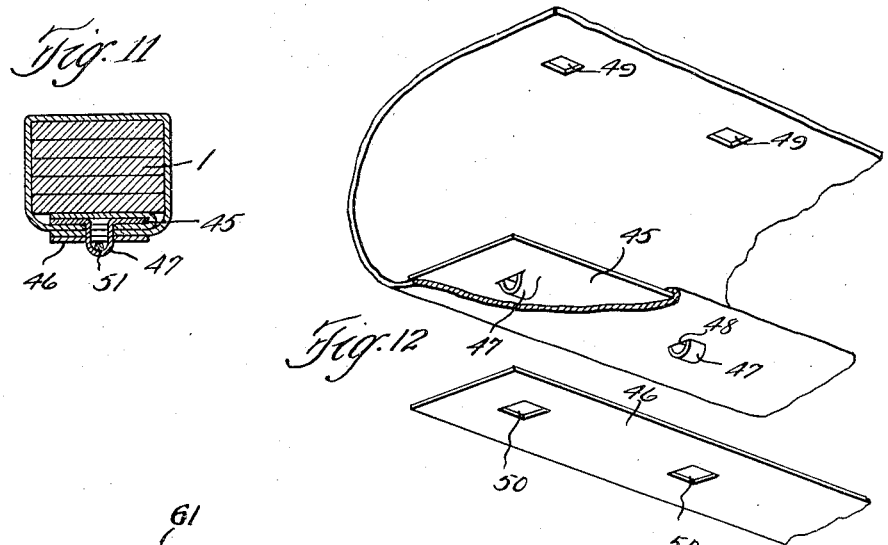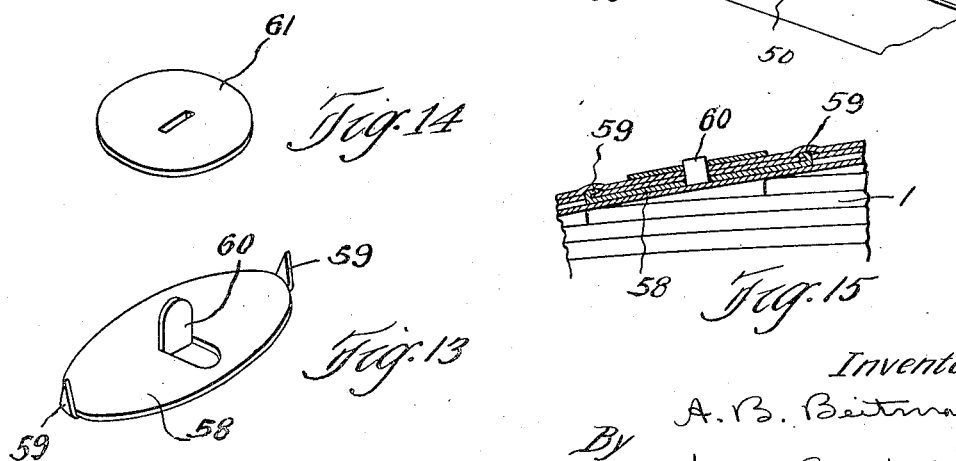

Patented Sept. 8, 1925.

1,553,213

UNITED STATES PATENT OFFICE.

ALBERT B. BEITMAN, OF CLEVELAND HEIGHTS, OHIO, ASSIGNOR TO THE ALBE MANUFACTURING COMPANY, OF CLEVELAND, OHIO, A CORPORATION OF OHIO.

SPRING COVER AND LUBRICATOR.

Application filed May 11, 1922. Serial No. 559,999.

*To all whom it may concern:*

Be it known that I, ALBERT B. BEITMAN, a citizen of the United States, residing at Cleveland Heights, in the county of Cuyahoga and State of Ohio, have invented a certain new and useful Improvement in Spring Covers and Lubricators, of which the following is a full, clear, and exact description, reference being had to the accompanying drawings.

This invention relates to that class of devices known as vehicle spring covers and lubricators, and its general objects are to improve, simplify and cheapen devices of this character.

A more specific object is to provide efficient fastening means for securing the edge portions of the cover together in overlapped condition and which is very economical of manufacture and especially convenient of use and which imparts a neat and attractive appearance to the cover.

Several embodiments of the invention are illustrated in the acompanying drawings.

Fig. 1 is a side elevation, and Fig. 2 a bottom plan view, of a vehicle spring equipped with one form of my invention; Fig. 3 is an enlarged perspective view of the cover partly applied to a spring, the end of the spring and the adjacent portion of the cover being broken away to reveal certain structural features; Fig. 4 is a transverse section through the spring and cover in the plane of the lubricant admitting device; Fig. 5, drawn to a smaller scale, shows the cover spread out; Fig. 6 is a perspective view of another form of my improved spring cover and lubricator applied to a spring; Fig. 7 is a fragmentary sectional side elevation of what is shown in Fig. 6; Fig. 8 shows this form of the invention removed from the spring; Fig. 9 is a section on the line 9—9 of Fig. 7; Fig. 10 shows, in side elevation, a further modification of the invention; Fig. 11 is a section on the line 11—11 of Fig. 10; Fig. 12 shows the cover illustrated in the two preceding views removed from the spring; Figs. 13 and 14 are the inner and outer parts, respectively, of another form of fastening means; and Fig. 15 is a sectional detail showing how this last mentioned form of fastening means is incorporated in the cover.

In all views wherein it appears, the vehicle spring is designated 1, and it is shown as provided with the usual clip 2, the bolt wherof is designated 3.

Describing that form of the invention illustrated in Figs. 1 to 5, 10 is a cover of flexible material, preferably a heavy and very durable fabric more or less absorbent and coated on its outer side with a permanent waterproofing material which may be in the imitation of leather; and the cover is cut to neatly fit a spring when wrapped about the same and slotted at 11 to acommodate the ends of the spring clip so that the portion between the slots may fit snugly over the bolt 3. Along one side, the material of the cover is turned back upon itself and stitched at 12 to provide a tubular casing 13 which is occupied by a series of plates 14 having lugs 15 that extend through slots in the outer side of the casing 13. The plates 14 are preferably stamped out of sheet metal with lugs 15 struck therefrom. The opposite edge of the cover is shown as hemmed at 16, and inwardly of the hem the cover is provided with slots 17 that are adapted to be engaged over the lugs 15 after the cover is applied to the spring. Plates 18, having slots 19, are then applied to the lugs 15 and the lugs bent over so as to hold the parts securely together. This means of fastening the edge portions of the cover together presents a very neat appearance and greatly facilitates the application of the cover to the spring. Furthermore, the parts 14 and 18, consisting of sheet metal stampings, are very cheap of manufacture.

In applying the cover to a spring I would recommend that it be coated on the inner side with a suitable lubricant, and then from time to time this lubricant may be replenished through means which I shall now describe. To the underneath side of that part of the cover which rests upon the top of the spring and preferably adjacent the elevated end thereof I apply a plate 20 having lugs 21 and which may be identical with the plates 14 except for the fact that at about its middle it is formed with an upwardly extending boss 22 that is internally threaded for the reception of a plug 23. A plate 25 is applied to the outer side of the cover and it has slots through which the lugs 21 extend, and an aperture through which the boss 22 projects, the lugs 21 being turned over the plate 25 to clamp the parts securely together.

I preferably make the bore of the boss 22 of a size to receive the threaded extensions of standard lubricating devices, such as oil cups, grease gun couplers, etc., although oil may be introduced through the boss 22 without any such additional means and the boss closed by the plug 23.

In the form of the invention illustrated in Figs. 6 to 9, I employ inner and outer metal strips 30 and 31, respectively, the former having lugs 32 and the latter slots 33. The cover is designated 34 and one of its lateral edge portions is arranged to be wrapped around the plate 30 and slotted for the lugs 32. A suitable distance inwardly from its opposite lateral edge the cover is provided with a series of slots 35. The plate 30 may be permanently secured to the cover if desired as by means of rivets 36. The cover is slotted at 37 to accommodate the ends of the spring clip 2. In applying this form of cover to the spring, the edge portion equipped with the plate 30 is placed along the top or bottom of the spring (depending upon the circumstances, it being necessary with the present arrangement to place it along the side opposite that on which the bolt 3 occurs.) The cover is then drawn securely about the spring, the slots 35 of the opposite edge portion are engaged over the lugs 32, the plate 31 is pressed down over the exposed edge portion of the cover with the lugs 32 projecting through the slots 33, and the lugs are bent over, as illustrated in Figs. 6 and 9.

For the purpose of introducing lubricant into this form of the cover I may provide the outer strip 31, inner strip 32, and the adjacent layers of the cover 34 with registering apertures to form a through opening 38, and this opening may be protected by a closure 39, pivotally connected to the plate 31 by a rivet 40.

The form of the invention illustrated in Figs. 10, 11 and 12 is quite similar to that just described so far as the essential elements are concerned. The inner and outer plates of the fastening means are designated 45 and 46, and the former has struck from it a series of loops 47 which are projected through openings 48 in the adjacent edge portion of the cover and which are adapted to be extended through openings 49 in the opposite edge portion of the cover when the device is applied to the spring. The plate 46 is then applied over the exposed edge of the cover and the loops 47 extended through slots 50 therein, after which a wire 51 is threaded through all of the loops and turned over at its ends to prevent dislodgment.

Oil may be admitted to this form of the cover through a boss 55 that is extended up through an aperture in the top of the cover and has a base engaged with the inner side thereof, the base being shown as provided with prongs 56 that are projected through and clinched over the adjacent part of the cover. A screw cap 57 closes the boss.

In the form of the invention illustrated in Figs. 13, 14 and 15, the fastening means comprises a series of inner and outer plates, the inner ones 58 being shown as elongated, with prongs 59 at their ends by means of which they may be secured to the cover, as illustrated in Fig. 15, and, at about their longitudinal centers, lugs 60 are struck therefrom. After the cover is applied to a spring slots in the free edge thereof are engaged over the lugs 60, washers 61, which constitute the outer elements of the fastening means, are applied to the lugs 60, and the lugs turned over to bind the parts securely together.

With respect to each form of the invention herein illustrated, it is apparent that the outer plate or element of the fastening means might be omitted, and if desired the slots or openings of the cover through which the lugs, or their equivalents, of the inner plate extend could be protected by eyelets. Such a change is so obvious as to make specific illustration thereof unnecessary.

Having thus described my invention, what I claim is:

1. A vehicle spring cover of flexible material conforming to the shape of the spring, the edge portions of said cover being arranged to overlap, a plate inside the cover having lugs extending through slots in the overlapped edges of the cover, and a slotted plate applied to the protruding ends of the lugs and beyond which the lugs are turned over thereby to bind the parts together.

2. A vehicle spring cover of flexible material conforming to the shape of the spring, the edges of said cover being arranged to overlap, a strip inside the cover and extending longitudinally thereof and having a plurality of lugs extending through slots in the overlapped edges of the cover, and a strip having slots corresponding in number and location with the lugs of the former strip, the second mentioned strip being adapted to be applied to the protruding ends of the lugs and beyond which the lugs are turned over to bind the parts together.

3. A vehicle spring cover of flexible material conforming to the shape of the spring, the edge portions of the cover being arranged to overlap, a series of plates inside the cover and disposed longitudinally thereof and having lugs extending through slots in the overlapped edges of the cover, and a series of slotted plates adapted to be engaged over the protruding ends of the lugs and beyond which said lugs may be turned over for binding the parts together.

4. A cover of flexible material adapted to be wrapped about a vehicle spring and conforming to the shape thereof, said cover having a tubular casing along one edge, a plurality of plates enclosed by said casing and having lugs extending through slots of the cover, the opposite edge portion of the cover having slots for engagement over the lugs, and slotted plates for application to the lugs and beyond which the lugs are adapted to be turned over for binding the parts together.

5. A cover of flexible material adapted to be wrapped about a vehicle spring and conforming to the shape thereof, a metallic strip about which one edge portion of the cover is arranged to be engaged, the said strip having a series of prongs extending through the cover, the opposite edge portion of the cover having a series of slots for application to said prongs, and a second strip having slots corresponding in number and position with the lugs of the first mentioned strip and adapted to be engaged over the protruding ends of the lugs and beyond which the lugs are turned over to secure the parts together.

6. A cover of flexible material adapted to be wrapped about a vehicle spring and conforming to the shape thereof, a metallic strip about which one edge portion of the cover is adapted to be engaged, means for securing the strip to the cover, the said strip having a series of lugs extending through the cover, the opposite edge portion of the cover having a series of slots for application to said lugs, and a second strip having slots corresponding in number and position with the lugs of the first mentioned strip and adapted to be engaged over the protruding ends of the lugs, and beyond which the lugs may be turned over to secure the parts together.

7. A cover of flexible material adapted to be engaged about and secured to a vehicle spring, a plate inside the cover, a plate outside the cover, one of said plates having parts extending through the cover and engaging with the other plate thereby to secure them to the cover, the plates and cover having registering apertures, and an element for closing said apertures.

8. A cover of flexible material adapted to be engaged about and secured to a vehicle spring, a plate inside the cover, a plate outside the cover, one of said plates having parts extending through the cover and engaging with the other plate thereby to secure them to the cover, the plates and cover having registering apertures, the aperture of one of the plates being surrounded by a boss, and an element having threaded engagement with said boss.

9. A vehicle spring cover of flexible material adapted to be engaged about the spring with its edge portions overlapped, two elements disposed one inside and one outside the overlapped edge portions, parts extending through said edge portions and connecting the two elements to bind the parts together, the edge portions and elements having registering openings through which a lubricant may be introduced into the cover, and means for closing the openings.

10. A vehicle spring cover of flexible material adapted to be engaged about the spring with its edge portions overlapped, and a plate disposed within said cover and having a lug or lugs extending through registering openings in the overlapped edge portions and turned over therebeyond to bind said edge portions together.

11. A cover of flexible material adapted to be wrapped about a vehicle spring, said cover having a tubular casing along one edge, the casing having apertures spaced apart longitudinally of the cover, and a metallic element in said casing having correspondingly spaced integral parts projecting through said apertures, the other edge of the cover being adapted to be secured to said parts.

12. A cover of flexible material adapted to be wrapped about a vehicle spring, said cover having a tubular casing along one edge, the casing having apertures spaced apart longitudinally of the cover, a metallic element in said casing having correspondingly spaced integral parts projecting through said apertures, and a second metallic element applied to the other edge of the cover for cooperation with the aforesaid parts of the former element for securing the edge portions of the cover together.

In testimony whereof I hereunto affix my signature.

ALBERT B. BEITMAN.